Nov. 23, 1954　　H. E. DARLING　　2,695,381
FOLLOW-UP TYPE OF MEASURING APPARATUS
Filed July 24, 1952
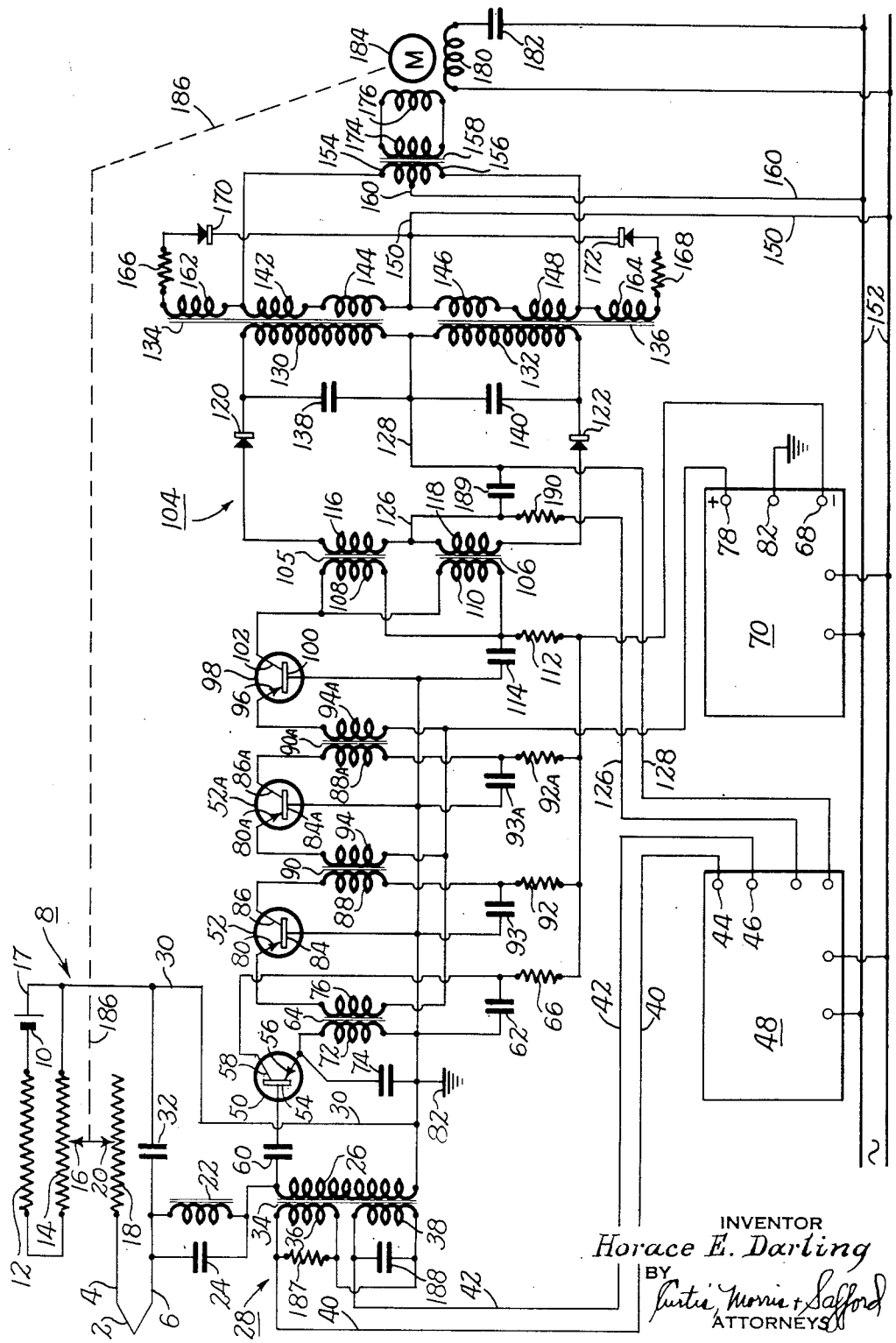
INVENTOR
*Horace E. Darling*
BY
*Curtis, Morris + Safford*
ATTORNEYS United States Patent Office 2,695,381
Patented Nov. 23, 1954

2,695,381

FOLLOW-UP TYPE OF MEASURING APPARATUS

Horace E. Darling, North Attleboro, Mass., assignor to The Foxboro Company, Foxboro, Mass.

Application July 24, 1952, Serial No. 300,745

3 Claims. (Cl. 318—28)

This invention relates to rebalanceable measuring instruments and more particularly to instruments for measuring accurately the value of small direct currents such as those supplied by a thermocouple.

In the illustrated embodiment of the present invention, a thermocouple is connected to a rebalanceable potentiometer circuit. The unbalanced direct current from this network controls a second-harmonic converter which produces an alternating current signal whenever a direct current is applied to it, but which does not deliver any alternating current signal in the absence of a direct current signal. This alternating current signal is fed through an impedance-matching isolation stage including a transistor and is amplified by successive transistor elements. This amplified signal is fed into a phase detection circuit, rectified, and then applied to a magnetic amplifier. The output signal controls a reversible motor that is connected to rebalance the potentiometer network.

It is among the objects of this invention to provide a simplified rebalancing measuring system having high sensitivity to direct-current signals, good stability, low heat dissipation, and which is small in size.

Other objects, advantages, and aspects of this invention will be in part pointed out in and in part apparent from the following description of a particular embodiment of the invention considered together with the accompanying drawing which shows the schematic diagram of a rebalanceable measuring system incorporating the invention.

A thermocouple 2 is connected by leads 4 and 6 to a balanceable potentiometer network, generally indicated at 8. The voltage developed by the thermocouple 2 is balanced against voltage derived from a standard cell 10. One terminal of the standard cell 10 is connected through a relatively high value resistor 12, for example 100,000 ohms, to one end of a lower value resistor 14 which has a slidable contact 16. This resistor 14 may be in the form of slide wire, for example arranged in a helix, or a conventional type potentiometer resistance element may be used, the choice depending upon the accuracy with which the measurements must be made. The other terminal of the standard cell 10 is connected by a lead 17 to the opposite end of the resistor 14.

The lead 4 from the thermocouple 2 is connected to the balanceable potentiometer bridge through a variable resistor 18 having a sliding contact 20 that is connected electrically to and mechanically gauged for movement with the slidable contact 16 of the resistor 14. Resistors 14 and 18 are identical so that the resistance in the thermocouple circuit is maintained constant independent of the slider position and thus renders the full scale range of the instrument independent of the slider position.

The other lead 6 from the thermocouple is connected through a band-rejection filter, comprising an inductor 22 connected in parallel with a capacitor 24, a winding 26 of a second-harmonic converter, generally indicated at 28, and a lead 30 to the lead 17 which connects the standard cell 10 and resistor 14. The lead 30 is connected to the common ground circuit in this particular embodiment. The band-rejection filter prevents alternating current produced by the converter 28 from reaching the potentiometer network. A condenser 32 connected between the thermocouple lead 6 and the lead 30 further protects the thermocouple and the voltage-balancing circuits from the alternating voltages that may be induced in the thermocouple leads from neighboring electrical equipment.

The voltages from the standard cell 10 and the thermocouple 2 are connected in opposition so that when the sliders 16 and 20 are adjusted to the null position, no direct voltage appears between the thermocouple lead 6 and the lead 30, that is, the voltage between the slider 16 and the lead 30 is equal and opposite to the thermocouple voltage.

In this circuit, the standard cell 10 is allowed to remain in the circuit at all times when the system is in use whereas in the usual system the standard cell is switched periodically into and out of the circuit. The present circuit arrangement, however, so limits the current that can be drawn from the standard cell, that its life is not shortened materially. A constant reference current is thus provided which is independent of the unbalance of the potentiometer network.

The second-harmonic converter 28 includes a saturable core structure 34, which may be formed of two ring cores of ferromagnetic material. Two alternating current windings 36 and 38 are wound on the core structure and are connected in series so as to produce opposing flux so far as winding 26 is concerned. The windings 36 and 38 are connected by two leads 40 and 42 to output terminals 44 and 46 of a conventional oscillator indicated in block form at 48. This oscillator may deliver a signal of 1000 cycles per second, or any other frequency may be used, that is suited to the characteristics of the other apparatus.

So long as no direct current flows through the winding 26, the circuit is balanced and no alternating current component is introduced in the winding 26. Resistor 187 and condenser 188 serve to correct for inequalities of windings 36 and 38 and provide a more complete balance of the fundamental alternating voltage induced in winding 26 when no direct current flows therein. However, if direct current flows in the winding 26, an alternating current component is introduced in the winding 26 at a frequency double that of the signal delivered by the oscillator 48. It will be apparent that the direct current flux, at any given instant, opposes the flux produced by the oscillator 48 in one of the windings 36 and 38 and assists the flux in the other one of these windings. During the succeeding half-cycle, the direct current aids the flux in the other winding. The principles of operation and construction of devices of this general type are well known; see, for example, U. S. Patent 2,164,383 issued to Burton, July 4, 1939.

The filter formed by the inductor 22 and the capacitor 24 is resonant at the second-harmonic frequency of the signal produced by the oscillator 48 and accordingly provides isolation between the potentiometer network and the alternating current.

In order not to draw excessive current from the converter output winding 26 and thereby decrease its efficiency, a transistor 50 is imposed between this winding and the first amplifying transistor 52 as an impedance transforming device.

The transistor 50 includes a semi-conducting body having a base electrode 54, an emitter electrode 56, and a collector electrode 68. The semi-conducting body may, for example, consist of crystalline germanium or silicon. The base electrode 54 of the transistor is in low resistance or ohmic contact with the crystal and may be a large area electrode. The emitter and collector electrodes 56 and 58 are in rectifying contact with the crystal and may be point contacts or line contacts or they may have a comparatively large area of contact with the crystal.

The alternating signal component appearing across the winding 26 is fed through a coupling condenser 60 to the base 54 of the transistor 50. The collector electrode 58 is coupled to the common ground circuit through a condenser 62 and thus is maintained at the same A.-C. potential as the other end of the winding 26 which is connected directly to the common ground circuits. With this arrangement, the input impedance of the isolation transistor 50 is relatively high so that no substantial load is placed on the winding 26. The output signal from the transistor 50 is coupled in a low impedance circuit through a transformer 64 to the transistor 52.

Transistors exhibit relatively wide variations in their characteristics, and furthermore because of the internal mutual impedance coupling effect between the input and output circuits of transistors, they are extremely sensitive to proper and improper impedance matching. Furthermore, transistors have a relatively low input impedance in their emitter circuits and a high output impedance in their collector circuits; so that when more than one successive transistor stages are used in a circuit, or when they are operated out of or into other circuit elements of different impedance, an interstage impedance matching device, such as a coupling transformer is required.

In the present circuit, the input and output impedance of each of the transistors is controlled by selecting the value of a resistance in the collector circuit to control the current through the transistor so that the particular transistor is matched to the adjacent impedance coupling circuit. The result is that it is possible to use only one, or sometimes two standardized impedance coupling arrangements or coupling transformers in production, reducing the labor required to build an instrument and materially decreasing the number and types of transformers which must be kept on hand.

In order to control the input and output impedance of the transistor 50, a resistor 66 is connected between the collector electrode 58 and a negative-voltage supply terminal 68 of a conventional rectifier-filter power supply, indicated in block form at 70. The resistor 66 controls the magnitude of the direct current flowing from the emitter 56 to the collector 58, and this current flow in turn affects the input and output impedances of the transistor 50. The value of this resistor is selected therefore to provide the desired impedance match.

In commercially produced measuring apparatus of this type, the impedances of the individual transistors are matched to standard inter-stage transformers, by adjusting the resistors in the collector circuits of the individual transistors to secure the maximum output. Thus, the correct value for each transistor is quickly determined. This value may be marked in code on the transistor itself, and a fixed resistor of the correct value inserted permanently into the circuit. Whenever a transistor is removed from the circuit and replaced, the corresponding resistor is also replaced, for each transistor and its series resistance or resistances are treated as a unitary circuit component. Considerable time and labor are saved wthen any transistor is changed, because it is not necessary to change the interstage transformer in order to obtain a proper impedance match with the replacement transistor, even though the characteristics of the replacement transistor may be markedly different from the old transistor.

The primary winding 72 of the transformer 64 is connected between the emitter electrode 56 of the transistor 50 and the common ground circuit. A condenser 74 is connected in parallel with winding 72 to form a tuned circuit resonant at the second-harmonic frequency, thereby providing a further increase in gain. The secondary winding 76 of this transformer is connected between a positive-voltage supply terminal 78 of the power supply 70 and the emitter electrode 80 of the transistor 52. The voltage between the positive terminal 78 and the grounded power supply return terminal 82 may be of the order of 0.10 volt and the emitter 80 is then biased slightly positive relative to ground. The terminal 68 is at a potential of about 50 volts negative from ground.

The base electrode 84 of the transistor 52 is connected to ground; and its collector electrode 86 is connected through the primary winding 88 of a standardized interstage coupling transformer 90 and through a selected resistor 92 to the negative-voltage supply terminal 68. A by-pass condenser 93 is connected from the junction of winding 88 and resistor 93 is connected from the junction of winding 88 and resistor 92 to ground. The resistor 92 is selected to produce maximum output voltage across the secondary winding 94 of the transformer 90.

The next amplifier stage incorporating a transistor 52A may be identical with the stage just described, except that the value of the resistor 92A may be different from that of the resistor 92 because of the difference in the characteristics of the particular transistors that are used.

The output signal from the secondary winding 94A is fed to the emitter 96 of a transistor 98. The base 100 of this transistor is grounded and its collector 102 is coupled into the phase detector and magnetic amplifier, generally indicated at 104, through two interstage coupling transformers 105 and 106. The primary windings 108 and 110 are connected in parallel. One end of the windings is connected to the collector electrode 102 and the other end is connected through a resistor 112 to the negative supply terminal 68. A condenser 114 is connected from the junction of the resistor 112 and the transformer windings to ground. Transformers 105 and 106 may be combined into a single unit, if desired, with a single primary and a center-tapped secondary.

The secondary windings 116 and 118 are connected in series between two half-wave rectifiers 120 and 122 in the phase-detecting circuit. The amplified unbalanced signal appearing across the secondary windings 116 and 118 is exactly twice the frequency of a comparison signal which is supplied from the oscillator 48 through two leads 126 and 128 and a phase-shifting network formed by resistor 190 and condenser 189. The resistor 190 and condenser 189 are used to produce the proper phase relationship between the fundamental voltage at leads 126 and 128 and the signal voltage from the transformer windings 116 and 118. These leads are connected to couple the oscillator signal between the junction of windings 116 and 118, and the junction of two control windings 130 and 132 of two magnetic amplifier units 134, 136 which are connected in series between the output electrodes of the half-wave rectifiers 120 and 122. Two filter condensers 138 and 140 are connected respectively in parallel with the windings 130 and 132.

Assume that the potentiometer network is unbalanced in one direction so that the amplified alternating current signal appears across the secondary windings 116 and 118 where it is combined with the oscillator comparison signal. This unbalanced signal has twice the frequency of the comparison signal, and by virtue of the phase shifting action of the resistor 190 and condenser 189, the positive voltage peak of the comparison signal may be made to coincide with the positive peak of the second-harmonic signal, while the negative peak of the second-harmonic signal opposes the negative peak of the reference signal. The result is that successive half-cycles of the comparison voltage are alternately increased and decreased by the unbalanced signal. Since the secondaries 116 and 118 are connected in a reverse sense, the increased half-cycles appearing across the secondary 116 are of opposite sign from those appearing across the secondary 118, so that one of the rectifiers 120 or 122 conducts a larger current than the other rectifier. When the potentiometer is unbalanced in the opposite direction, the voltage relationship of the unbalanced and comparison signals is reversed, and the other rectifier conducts more current. Thus, depending upon the direction of unbalance of the potentiometer, a larger direct current component flows through one or the other of the control windings 130 and 132 of the magnetic amplifiers 134 and 136.

Each of these magnetic amplifiers 134 and 136 has two signal windings as indicated at 142, 144, 146, and 148, with windings 144 and 148 wound in a reverse sense with respect to windings 142 and 146, respectively, to minimize coupling with the control windings 130 and 132. All four of these windings are connected in series and at their midpoint are connected to a common lead 150 that is connected to one terminal of an alternating current source, such as ordinary power mains 152.

The windings 142 and 148 are connected through the halves 154 and 156, respectively, of the center-tapped primary of the transformer 158 and to the other side of the power mains by a common lead 160. Feedback windings 162 and 164 on the magnetic amplifier 134 and 136 are connected from the split primary windings 154 and 156, through current control resistors 166 and 168 and half-wave rectifiers 170 and 172, respectively, to the common lead 150. The magnetic amplifier 134 described is only one of many types suitable for use in this connection, as is well known in the art.

The secondary 174 of the transformer 158 is connected to a stator winding 176 of the two phase reversible induction motor, generally indicated at 178. The other stator winding 180 is connected through a phase shift condenser 182 to the power mains 152. In order to drive the slidable contacts 16 and 20 of the potentiometer 8, the rotor 184 is connected thereto through a suitable mechanical linkage diagrammatically illustrated at 186.

Assume that the potentiometer 8 is unbalanced so as to produce an increased direct current through the control winding 130 to increase the saturation of the core of the amplifier 134 and so to reduce the inductance of the windings 142 and 144. An increased alternating current consequently flows through the half 154 of the primary of the transformer 158, inducing an alternating current in its secondary winding 174 which flows through the motor winding 176. This current in the winding 176 acts together with the phase-shifted current in the winding 180 to produce a rotating magnetic field, causing the rotor 184 to turn and move the sliding contacts 16 and 20 to the balanced position.

When the potentiometer is unbalanced in the opposite direction, similar action occurs to produce a larger alternating current flow through the primary half 156 of the transformer 158. The phase of the current flowing through the motor winding 176 is now reversed 180° so that the rotor 184 turns in the opposite direction, and the sliding contacts 16 and 20 are again moved in the direction to rebalance the potentiometer 8.

Suitable indicating, recording, or controlling apparatus (not shown) can be connected to the slidable contacts 16 and 20 or to the linkage mechanism 186.

I claim:

1. A measuring system comprising a balanceable potentiometer network, a source of D.-C. voltage to be measured connected to said network, an alternating current source, a second-harmonic converter having magnetic core material providing two different flux paths, energizing windings associated with each path and connected to said source to induce alternating flux in said paths, a second-harmonic winding associated with each of said paths and having first and second terminals connected to the output of said potentiometer, a first transistor having an emitter, collector, and a base electrode, said base electrode being coupled to said first terminal of said second-harmonic winding, an interstage transformer having primary and secondary windings, circuit means connecting said primary winding between said second terminal of said second-harmonic winding and the emitter electrode of said first transistor, the collector of said first transistor being substantially at a fixed A.-C. potential with respect to ground, multi-stage transistor amplification means coupled to the secondary winding of said interstage transformer and including a second transistor having a base electrode connected to said second output terminal of said second-harmonic winding, phase-detecting means coupled to said source and to the output of said amplification means, magnetic amplification means connected to the output of said phase-detecting means, and motor means connected to the output of said amplification means and arranged to rebalance said potentiometer network.

2. A measuring system comprising a balanceable potentiometer network, a source of D.-C. voltage to be measured connected to said network, an alternating current source, a second-harmonic converter having magnetic core material providing two different flux paths, energizing windings associated with each path and connected to said source to induce alternating flux in said paths, a second-harmonic output winding associated with each of said paths and having first and second terminals connected to the output of said potentiometer network, a first transistor having an emitter and a base electrode, first and second capacitance means, said first capacitance means coupling said base electrode to said first output winding terminal, said second capacitance means coupling said collector electrode to said second output winding terminal an interstage transformer having primary and secondary windings, circuit means connecting said primary winding between said second output winding terminal and the emitter electrode of said first transistor, a multi-stage transistor amplifier coupled to the secondary winding of said interstage transformer and including a second transistor having a base electrode connected to said second terminal of said output winding, phase-detecting means coupled to said oscillator and to the output of said amplifier, direct-current amplification means connected to the output of said phase-detecting means, and motor means connected to the output of said amplifier and arranged to rebalance said potentiometer network.

3. A measuring system comprising a balanceable potentiometer network, a source of D.-C. voltage to be measured connected to said network, an alternating current source, a second-harmonic converter having magnetic core material providing two different flux paths, energizing windings associated with each path and connected to said source to induce alternating flux in said paths, an output winding associated with each of said flux paths and having first and second terminals connected to the output of said potentiometer, said second-harmonic converter being arranged so that no second-harmonic current of said alternating-current source flows in said output winding when said potentiometer network is in balance condition and no direct voltage is applied to said output winding, means connecting said second terminal of said output winding to the common ground circuit, a first transistor having an emitter and a base electrode, said base electrode being coupled to said first output winding terminal, an interstage transformer having primary and secondary windings, circuit means connecting said primary winding between the emitter electrode of said first transistor and the common ground circuit, multi-stage transistor amplification means coupled to the secondary winding of said interstage transformer and including a second transistor having a base electrode connected to said second output terminal of said output winding, phase-detecting means coupled to said oscillator and to the output of said amplification means, direct-current amplification means connected to the output of said phase-detecting means, and motor means controlled by the output of said direct current amplification means and arranged to rebalance said potentiometer network.

References Cited in the file of this patent

UNITED STATES PATENTS

| Number | Name | Date |
|---|---|---|
| 2,531,682 | Hornfeck | Nov. 28, 1950 |
| 2,586,603 | Beggs, Jr. et al. | Feb. 19, 1952 |
| 2,653,282 | Darling | Sept. 22, 1953 |